R. SEJNOHA.
MACHINE FOR SEALING BREAD WRAPPERS OR THE LIKE.
APPLICATION FILED JULY 9, 1918.
1,286,804.
Patented Dec. 3, 1918.
2 SHEETS—SHEET 1.
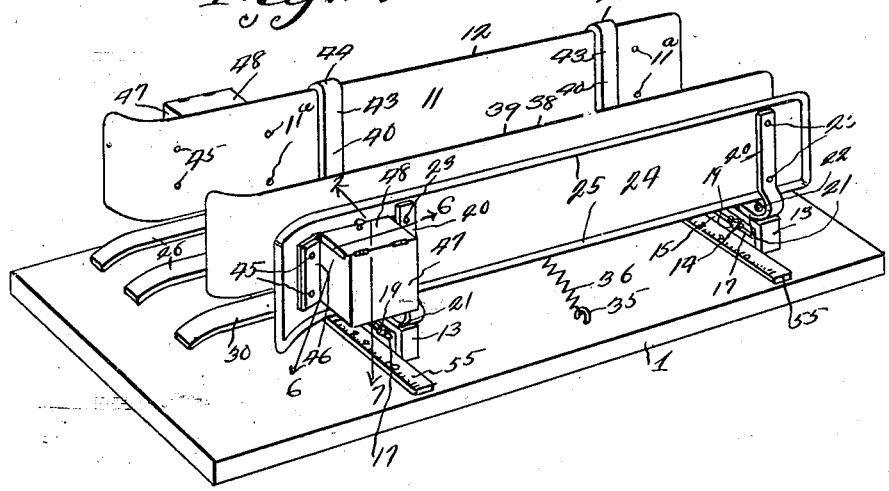
Inventor
R. Sejnoha
Witnesses R. SEJNOHA.
MACHINE FOR SEALING BREAD WRAPPERS OR THE LIKE.
APPLICATION FILED JULY 9, 1918.
1,286,804.
Patented Dec. 3, 1918.
2 SHEETS—SHEET 2.
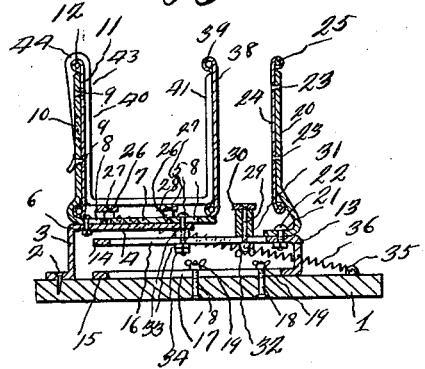
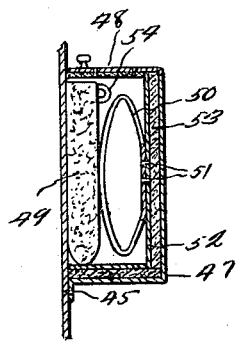
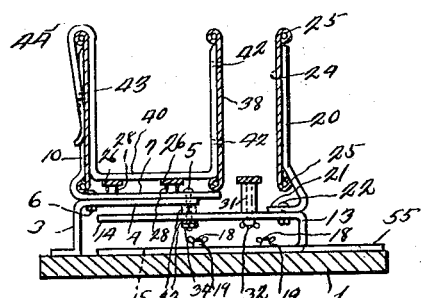
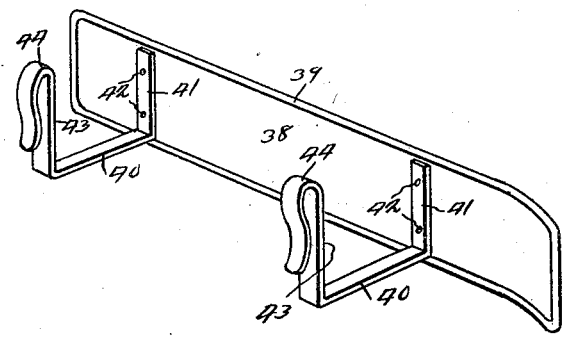
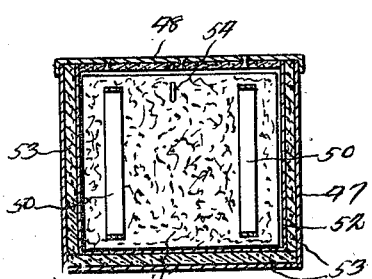
Witnesses
Philip Ferrell
Francis L. Barwell
Inventor
R. Sejnoha
By D. Swift & Co.
Attorneys

UNITED STATES PATENT OFFICE.

RICHARD SEJNOHA, OF WOLSEY, SOUTH DAKOTA.

MACHINE FOR SEALING BREAD-WRAPPERS OR THE LIKE.

1,286,804. Specification of Letters Patent. Patented Dec. 3, 1918.

Application filed July 9, 1918. Serial No. 244,036.

*To all whom it may concern:*

Be it known that I, RICHARD SEJNOHA, a citizen of the United States, residing at Wolsey, in the county of Beadle, State of South Dakota, have invented a new and useful Machine for Sealing Bread-Wrappers or the like; and I do hereby declare the following to be a full, clear, and exact description of the invention, such as will enable others skilled in the art to which it appertains to make and use the same.

This invention relates to an improved machine for sealing bread wrappers and the like.

In the present machine as also in the machine covered by the Patent No. 1,269,866, issued June 18, 1918 to Richard Sejnoha (on which the present invention is an improvement) there is involved the provision of opposing members, between which the loaves of bread are guided, and between which the ends of the wrapper are sealed, by means of suitable heating units, and there is also involved means to permit the opposing members to be adjusted.

The aim of the present invention consists in the provision of an auxiliary attachment, coöperating with one of the opposing members, whereby sandwich, doughnut and like wrappers may be sealed.

This invention further aims to provide improved holders on the outer faces of the opposing members, to support or contain any suitable heating unit, either a warming plate or stone.

In practical fields the details of construction may necessitate alterations falling within the scope of what is claimed.

The invention comprises further features and combination of parts as hereinafter set forth, shown in the drawings and claimed.

In the drawings:—

Figure 1 is a view in perspective of the improved wrapper sealing machine constructed in accordance with the invention.

Fig. 2 is a plan view of the same.

Fig. 3 is a cross sectional view on line 3—3 of Fig. 2.

Fig. 4 is a cross sectional view on line 4—4 of Fig. 2.

Fig. 5 is an enlarged detail perspective view of the auxiliary attachment or opposing member.

Fig. 6 is a sectional view on line 6—6 of Fig. 1.

Fig. 7 is a sectional view on line 7—7 of Fig. 1.

Referring more especially to the drawings, 1 designates a base, and secured to said base near one edge thereof by means of screws 2 are the supporting brackets 3, the arms 4 of which overlie the base, and the extremities of these arms 4 carry the bolts 5. Also carried by the arms 4 are bolts 6. Brackets 7 are guided upon the upper faces of said arms 4 by means of the bolts 5 and 6, which engage through the slots 8 of the brackets 7. Secured by the rivets 9 to the upstanding parts 10 of the brackets 7 is a plate 11, which is constructed of any suitable sheet metal preferably sheet iron, the marginal edge of which has a stiffened bead 12. Mounted upon the base 1 are U-shaped brackets 13, the upper and lower arms 14 and 15 of which have elongated slots 16 and 17. Screws 18 engage upwardly through the base and through the slot 17, and their upper ends are provided with nuts 19. Supporting uprights 20 have their lower inwardly extending ends 21 secured by bolts 22 to the upper arms of the brackets 13, that is near their crotches. Secured by rivets 23 to the uprights 20 is a plate 24 constructed of any suitable sheet metal preferably sheet iron, and its marginal edge has a stiffened bead 25. Longitudinally extending guide bars 26 are secured by rivets 27 to the horizontal portions of the brackets 7, there being spacing collars 28 between the guide bars and said brackets. Headed bolts 29 engage the slots 16 of the upper arms 14 of the brackets 13. The heads of these bolts 29 are countersunk in the longitudinally extending guide bar 30, which is similar to the guide bars 26. Spacing sleeves 31 are mounted upon the bolts 29 (the lower ends of which have thumb nuts 32) to space the guide bar 30 above the upper arm 14 of the bracket 13. It is to be noted that by loosening the thumb nuts 32 and tightening them again the guide bar 30 may be adjusted transversely of the upper arms 14 of the brackets 13, and held adjusted. The guide bars 26 and 30 are in horizontal plane with each other so as to support loaves of bread thereon as they are fed between the opposing plates 11 and 24 in order that their wrappers may be sealed. These screws 5, are long enough to pass through the slots 16 of the upper arms 14 of the brackets 13, and have nuts 33 threaded thereon above and below the arms 14. By tightening up on the nuts 33, the bolts 5 may be held secure, and particularly so by means of the lock nuts 34 on the lower ends of the bolts 5. The upper nuts 33 are applied to the bolts 5, so as to permit of sufficient space between the nuts and the heads of said bolts, whereby the horizontal part of the bracket 7 may freely move. The bolts 5 pass through the extremities of the arms 4. A suitable coil tension spring 36 has one end connected to one of the guide bars 26 as shown at 37, and the other end of said spring is connected to an eye 35 on the base. By means of this spring the sheet metal plate 11 will bear yieldably against the loaves of bread, which are guided between the opposing sheet metal plates 11 and 24. By adjusting the U-shaped brackets 13, the sheet metal plate 24 may be adjusted a considerable distance from the sheet metal plate 11, so as to accommodate extra long loaves of bread. The forward ends of the opposing plates 11 and 24 are turned outwardly, and so are the forward ends of the guide bars 26 and 30 flared or turned downwardly. In order to seal wrappers on sandwiches, candy bars, doughnuts and the like, which are more or less narrow, an auxiliary sheet metal plate is provided, designated by the numeral 38, and which has its marginal edge provided with a stiffened bead 39. The forward end of this auxiliary plate which is constructed of any suitable sheet metal preferably sheet iron is turned outwardly in a direction opposite to the outwardly turned end of the plate 24. Suitable brackets 40, which are U-shaped have their arms 41 secured by rivets 42 to the auxiliary plate 38, while their arms 43 are bent over the upper edge of the plate 11 at 44 and down upon the exterior surface of said plate 11, whereby the transverse parts of the U-shaped brackets 40 may rest and guide upon the longitudinal guide bars 26, thereby holding the plate 38 in opposed position to the plate 24. Between the plates 24 and 38 sandwiches, peanut brittle, doughnuts and the like may be sealed. Secured upon the outer faces of the plates 11 and 24 as shown at 45 by means of the holding plates 46 are containers or casings 47, which are provided with hinged lids 48, and are designed to receive heating units, such as shown at 49. These heating units may be constructed of stone or heavy iron, and four of them are designed for use. While two are being used another two may be heating in an oven. These heating units are held in the containers by means of the elliptical spring devices 50, which are riveted at 51 to auxiliary metal linings 52, which are supported in the containers, there being asbestos fillers 53 between the linings and the walls of the containers, and there are eyes 54 carried by the heating units to allow them to be extracted. Electrical heating units may be substituted for the units 49, and in this case the lids are left open for the wires. In the operation of the machine the bread is first wrapped, and the adhesive ends of the wrapper are folded against the ends of the bread and passed between the opposing plates. When the bread reaches a point opposite the heating unit containing members, the ends of the wrapper are sealed. Sandwiches, doughnuts, and candy bar or peanut brittle and like articles have their wrappers sealed in a similar manner, but are passed between the auxiliary attachment and one of the permanent plates. Secured to the base are strips 55 having graduations according to which the opposing sides may be set for gaging different lengths of articles to be sealed.

The invention having been set forth what is claimed as new and useful is:—

1. In a machine for sealing wrappers, the combination with a pair of opposing guide plates, of supporting guide bars between the plates, which together with the plates form a trough, through which wrapped loaves of bread pass, the outer faces of corresponding adjacent ends of said plates having heating units for sealing the ends of the wrappers, and an auxiliary guide plate to be spaced in opposition to either one of the first guide plates, U-shaped brackets to certain corresponding arms of which the auxiliary plate is attached, the other corresponding arms of the U-shaped brackets being bent over and adjacent the outer face of the other of the first plates.

2. In a machine for sealing wrappers, a guide trough for the reception of wrapped loaves of bread and having opposing sides, heating units on the outer faces of the sides adjacent their corresponding ends, an auxiliary side adapted to be disposed in close but spaced relation to one of the sides and between which and one of the sides small articles are adapted to be passed for sealing their wrappers, and means detachably connected to one of the sides of the trough and supporting the auxiliary side in close but spaced relation to the other side of the trough.

3. In a machine for sealing wrappers, a base, a pair of angle brackets mounted upon the base, a pair of L-shaped brackets slidably connected and mounted upon the angle brackets, guide bars secured to the horizontal parts of the L-shaped brackets, a pair of U-shaped brackets secured to the top of the base, uprights mounted upon the U ends of the U-shaped brackets, opposing plates carried by the uprights and by the vertical arms of the L-shaped brackets and provided with heating units, the lower arms of the U-shaped brackets having elongated slots, means passing through the slots and into the base for holding the U-shaped brackets in different adjusted positions horizontally, the upper arms of the U-shaped brackets having slots, means carried by the adjacent ends of the L-shaped and angle brackets adjustable in the slots of the upper arms of the U-shaped brackets, and an additional guide bar having adjustable connections with the slots of the upper arms of the U-shaped brackets.

4. In a machine for sealing wrappers, a base, a pair of angle brackets mounted upon the base, a pair of L-shaped brackets slidably connected and mounted upon the angle brackets, guide bars secured to the horizontal parts of the L-shaped brackets, a pair of U-shaped brackets secured to the top of the base, uprights mounted upon the U ends of the U-shaped brackets, opposing plates carried by the uprights and by the vertical arms of the L-shaped brackets and provided with heating units, the lower arms of the U-shaped brackets having elongated slots, means passing through the slots and into the base for holding the U-shaped brackets in different adjusted positions horizontally, the upper arms of the U-shaped brackets having slots, means carried by the adjacent ends of the L-shaped and angle brackets adjustable in the slots of the upper arms of the U-shaped brackets, and an additional guide bar having adjustable connection with the slots of the upper arms, and an auxiliary plate opposed in close but spaced relation to one of the first plates, and means for detachably supporting the auxiliary plate.

In testimony whereof I have signed my name to this specification in the presence of two subscribing witnesses.

RICHARD SEJNOHA.

Witnesses:
W. A. JOHNS,
W. B. FRY.